United States Patent Office 3,133,911
Patented May 19, 1964

3,133,911
REACTIVE DYESTUFFS
Hans-Rudolf Byland, Riehen, and Hans Ischer, Basel, Switzerland, assignors to Sandoz Ltd., Basel, Switzerland
No Drawing. Filed May 23, 1960, Ser. No. 31,214
Claims priority, application Switzerland May 22, 1959
6 Claims. (Cl. 260—154)

This invention relates to reactive dyestuffs of the formula

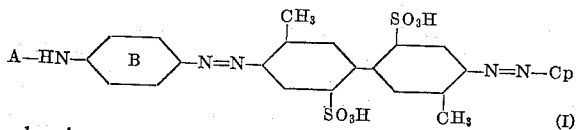

wherein
A represents the radical of a compound which contains at least one substituent that can be readily split off as an anion and/or a C—C multiple linkage capable of addition, and
Cp represents the radical of a coupling component of the naphthalene series and the nucleus B may contain further substituents.

The process for the production of the new reactive dyestuffs consists in reacting 1 mole of a compound which is condensible with a substance containing an exchangeable hydrogen atom and contains at least one substituent which can be readily split off as an anion and/or a C—C multiple linkage capable of addition, with 1 mole of an aminoazo dyestuff of the general formula

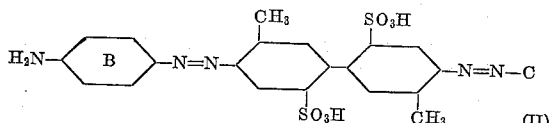

wherein Cp has the aforecited meaning and the nucleus B may be further substituted.

The aminoazo dyestuff of Formula II used as starting product is obtained by coupling the tetrazo compound of 1 mole of 4,4′-diamino-5,5′-dimethyl-1,1′-diphenyl-2,2′-disulfonic acid with 1 mole of a coupling component of the naphthalene series and with 1 mole of an aminobenzene which couples in para position to the amino group and may contain further substituents.

Examples of suitable coupling components of the naphthalene series based upon the radical Cp are hydroxynaphthalenemono-, -di- or -trisulfonic acids such as 1-hydroxynaphthalene-4- or -5-sulfonic acid, 2-hydroxynaphthalene-4-, -6-, -7- or -8-sulfonic acid, 1-hydroxynaphtalene-3,6-, -4,6-, -4,7- or -4,8-disulfonic acid, 2-hydroxynaphthalene-3,6- and -6,8-disulfonic acid, 1-hydroxy- and -2-hydroxynaphthalene-3,6,8-trisulfonic acid and their mixtures, 2-hydroxynaphthalene, aminohydroxynaphthalenemono- and -disulfonic acids and their N-acyl, N-alkyl and N-aryl derivatives such as 2-amino-8-hydroxynaphthalene-6-sulfonic acid, 2-amino-8-hydroxynaphthalene-3,6-disulfonic acid, 2-amino-5-hydroxy-naphthalene-7-sulfonic acid, 2-amino-5-hydroxynaphthalene-1,7-disulfonic acid, 1-amino-8-hydroxynaphthalene-3,6-disulfonic acid, 1-amino-8-hydroxynaphthalene - 2,4 - disulfonic acid, 1-amino-8-hydroxynaphthalene-4,6-disulfonic acid, 1,8-dihydroxynaphthalene - 3,6 - disulfonic acid, 1-amino-8-hydroxynaphthalene-4-sulfonic acid, 1-amino-8-hydroxynaphthalene-6-sulfonic acid, 2-amino-6-hydroxynaphthalene-8-sulfonic acid, 2-acetylamino-5-hydroxynaphthalene-7-sulfonic acid, 1-benzoylamino - 8 - hydroxynaphthalene-3,6-disulfonic acid, 2-(2′-4′,6′-trimethyl)-phenylamino-8-hydroxynaphthalene-6-sulfonic acid, 2-phenylamino-8-hydroxynaphthalene-6-sulfonic acid, 2-aminonaphthalene-6- or 7-sulfonic acid, 2-methylaminonaphthalene-6- or -7-sulfonic acid, 2-(4′-methoxy)-phenylamino-5-hydroxynaphthalene - 7 - sulfonic acid, 2-N-carbomethoxyamino-5-hydroxynaphthalene - 1,7 - disulfonic acid, 2-chloroacetylamino-8-hydroxynaphthalene-6-sulfonic acid, 2-β-chloropropionylamino - 5 - hydroxynaphthalene-7-sulfonic acid, 1-(4′,6′-dichloro - 1′,3′,5′ - triazinyl - (2′) - amino)-8-hydroxynaphthalene-3,6-disulfonic acid, 2-(4′,6′-dichloropyrimidyl-(2′)-amino) - 5 - hydroxynaphthalene-1,7-disulfonic acid and -7-monosulfonic acid.

Important aminobenzenes are e.g. aminobenzene, 1-amino-2- or -3-methylbenzene, 1-amino-3-acetylaminobenzene, 1-amino - 2,5 - dimethoxybenzene, 1-amino-5-methyl-2-methoxybenzene, 1-amino-3-propionyl- or butyrylaminobenzene, 1,3-diaminobenzene, 1-amino-2,5-dimethylbenzene, 1-amino-2,3-tetramethylenebenzene.

The substituent A is preferably the radical of an acid containing at least one mobile halogen atom and/or a C—C multiple linkage capable of addition, e.g. the radical of chloroacetic, bromoacetic, β-chloro- and β-bromopropionic, propiolic, acrylic, methacrylic, α-chloro-, β-chloro-, α-bromo- and β-bromoacrylic, α,β- and β,β-dichloro- or -dibromoacrylic, trichloro- or tribromoacrylic, crotonic, α-, β, γ-chlorocrotonic, α-, β-, γ-bromocrotonic, α-, β-dichlorocrotonic, maleic, monochloro- and monobromomaleic, dichloro- and dibromomaleic, fumaric, monochloro- and monobromofumaric, dichloro- and dibromofumaric acid, fumaric acid monoester, dichloro- and dibromosuccinic acid, or the radical of one of the following heterocyclic compounds: cyanuric chloride, cyanuric bromide, tetrameric cyanogen chloride or bromide, primary condensation products of the cyanuric chloride of the composition

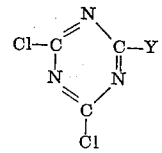

wherein Y stands for the radical, which may be further substituted, of a primary or secondary aliphatic alicyclic, aromatic, or heterocyclic amine, an aliphatic, alicyclic, arommatic or heterocyclic hydroxy or thiol compound, in particular the radical of aniline, its alkyl and sulfonic acid or carboxylic acid derivatives, low mono- and dialkylamines or the radical of ammonia; further 2,4,6-trichloropyrimidine and 2,4,6-tribromopyrimidine, their deriavtives which carry in the 5-position the following substituents, e.g. methyl, ethyl, carboxylic acid or sulfonic acid amide which may be substituted on the nitrogen atom, carboxylic acid methyl or ethyl ester, acyl, e.g. benzoyl, alkylene, e.g. allyl, chlorovinyl, substituted alkyl, e.g. carboxymethyl, chloro- or bromoethyl, a methylene group between two pyrimidine nuclei, 2,4,5,6-tetrachloro- or tetrabromopyrimidine, 2,6-dichloro- or -dibromopyrimidine-4-carboxylic acid ethyl ester, 2,4,5-trichloropyrimidine, 2,6-dichloro- or -dibromopyrimidine-4- or -5-carboxylic acid amide or sulfonic acid amide which may be substituted on the nitrogen atom, 2,5,6-trichloro-4-methyl-pyrimidine, 2,4-dichloro-5-chloromethyl - 6 - methylpyrimidine, 2,6-dichloro-4-trichloromethylpyrimidine. The substituent A can also be a diaryloxycyanuric radical, an arylurethane radical, an arylsulfonic acid alkyl radical, a sulfuric acid alkyl radical, an epoxy radical, a β-chloro- or β-bromoethyl radical.

The simplest method of introducing the acid radicals is to employ the corresponding acid halides or, in certain cases, the acid anhydrides. The reaction is carried out preferably at low temperatures, e.g. 0–20° C., and in presence of an acid-binding agent such as sodium carbonate, sodium hydroxide, calcium hydroxide or sodium acetate, at a weakly acid, neutral or weakly alkaline reaction, e.g. in the pH region of 4 to 9. To bring about acylation, the carboxylic acid chloride, either as such or dissolved in two to five times its amount of benzene, chlorobenzene, methylbenzene, dimethylbenzene or acetone, is added dropwise to the aqueous, well buffered solution of the substance containing the amino group, at a temperature of e.g. 2–5° C. Acylation with the anhydrides can be accomplished in the same way. The introduction of a cyanuric radical is best effected in aqueous medium at about 0° C. and at a weakly acid reaction, e.g. at pH values between 3 and 5.

Cyanuric chloride is employed as such in solid form or dissolved in an organic solvent, e.g. acetone. In the case of the primary condensation products of a cyanuric halide it is best to choose a temperature between 30° and 60° C. and a pH value of 4 to 6, while for the di-, tri- and tetra-halogenopyrimidines the temperature range of 40° to 100° C. is the most suitable, the pH region being preferably between 3 and 9.

On completion of condensation or coupling, the solution or suspension may be neutralized if desired and the final reactive dyestuff is salted out with sodium or potassium chloride or precipitated with acid. It is then filtered with suction, washed and dried.

The reactive dyestuffs of this invention are suitable, according to their constitution, for the dyeing, padding and printing of fibers of animal origin, e.g. wool and silk; synthetic polyamide fibers, e.g. nylon; leather; cellulosic fibers, e.g. cotton, hemp, linen; regenerated cellulosic fibers, e.g. viscose and cuprammonium rayon and mixtures of these fibers. The optimum conditions vary with the fiber and the dyestuff used. Animal fibers and synthetic polyamide fibers are dyed and printed or fixed in an acid, neutral or weakly alkaline medium, e.g. in presence of acetic acid, formic acid, sulfuric acid, ammonium sulfate, sodium metaphosphate, etc. Dyeing can also be carried out in the acetic acid to neutral region in presence of leveling agents, e.g. polyoxethylated fatty amines or mixtures of these and alkylpolyglycol ethers, and the bath brought to a neutral or weakly alkaline reaction at the end of dyeing by the addition of small amounts of an agent of alkaline reaction, e.g. ammonia, sodium bicarbonate, soda etc. or compounds which react alkaline on heating, e.g. hexamethylene tetramine, urea.

The dyed goods are then thoroughly rinsed and soured with a little acetic acid if necessary.

Application of the dyestuffs to cellulosic fibers by dyeing, padding and printing techniques is carried out to best advantage in an alkaline medium, e.g. in presence of sodium carbonate or bicarbonate, sodium hydroxide or potassium hydroxide solution, sodium metasilicate, sodium borate, trisodium phosphate, ammonia, etc. To preclude reduction effects in dyeing, padding or printing it is often an advantage to add a mild oxidizing agent, e.g. sodium 1-nitrobenzene-3-sulfonate. Generally the dyestuffs are fixed on cellulosic fibers by heat treatment. Depending on the reactivity of the reactive groups, a number of the dyestuffs can be dyed or fixed at low temperatures, e.g. 20–40° C.

The dyeings and prints obtained on cellulosic fibers are characterized by their outstanding fastness to wet agencies, which results from the formation of a stable chemical linkage between the dyestuff molecule and the cellulose molecule. In many cases the entire amount of applied dyestuff does not take part in the chemical reaction with the fiber; the unreacted portion of the dyestuff is then removed from the fiber by suitable operations such as washing and/or soaping, if necessary at high temperatures. For this purpose synthetic detergents may be used, e.g. alkylarylsulfonates, sodium lauryl sulfate, sodium lauryl polyglycol ether sulfate, mono- and dialkylphenolpolyglycol ethers. The dyeings on wool possess excellent fastness to light, perspiration, water, sea water, milling, crocking and dry cleaning, and a number of the dyestuffs show good dyeing properties on this fiber.

The dyeings on cellulose fibers possess excellent fastness to light, water, sea water, washing, perspiration, crocking alkali and dry cleaning.

The dyestuffs reserve acetate, triacetate and polyethylene terephthalate fibers.

In the following examples the parts and percentages are by weight and the temperatures in degrees centigrade.

Example 1

18.6 parts of 4,4'-diamino-5,5'-dimethyl-1,1-diphenyl-2,2'-disulfonic acid are dissolved in 50 parts of water with the addition of about 13.6 parts of 30% sodium hydroxide solution. After the addition of 6.9 parts of sodium nitrite the solution, at 0–15°, is run into a solution of 80 parts of sodium chloride and 27 parts of 30% hydrochloric acid in 200 parts of water. To the tetrazo compound is added a solution of 12.3 parts of 1-hydroxynaphthalene-4-sulfonic acid in 70 parts of water, followed by 100 parts of finely crushed ice. Over the next 3 hours a solution of 14.8 parts of crystallized sodium acetate in 15 parts of water is dropped in. The coupling mass is stirred overnight at 0° and next morning it is rendered weakly alkaline by the addition of sodium carbonate. After stirring for some time the suspension is brought to pH 5 with dilute acetic acid, and 4.8 parts of 1-amino-3-methylbenzene are added. Stirring is continued for about 10 hours, after which time sodium hydroxide solution is run in to make the solution weakly alkaline. It is then treated with a mixture of 3 parts of blood charcoal and 3 parts of infusorial earth. After filtration, the amonodisazo dyestuff formed is precipitated by acidification with 30% hydrochloric acid and filtered off.

The filter cake is dissolved in 250 parts of water at 60° and the solution adjusted to pH 4–5. After the addition of 9.2 parts of 2,4,6-trichloropyrimidine the mass is stirred for 4 hours at 60–65°, during which time dilute sodium carbonate solution is dropped in to maintain the pH value between 4 and 5. On completion of the reaction the solution is treated with blood charcoal. After the solution has been clarified by filtration, sodium chloride is added, causing the dyestuff to be precipitated. It is filtered with suction, and the press cake washed with sodium chloride solution and dried. On grinding the dyestuff is obtained as a red powder which dissolves in water to give yellow-red solutions.

A mercerized cotton fabric is printed with a paste of the following composition:

30 parts of above-described dyestuff,
100 parts of urea,
385 parts of water,
450 parts of 4% sodium alginate thickening,
10 parts of sodium 1-nitrobenzene-3-sulfonate,
25 parts of sodium carbonate.

1000 parts

The print is dried and fixed by steaming for 10 minutes. It is then rinsed with cold and again with hot water, soaped at the boil if necessary, given a further hot and cold rinse and dried. The print is of brilliant scarlet shade and possesses excellent fastness to wet treatments and good fastness to light.

In place of the 4.8 parts of 1-amino-3-methylbenzene used in this example, the equivalent amount of one of the following aminobenzenes: aminobenzene, 1-amino-2-methylbenzene, 1 - amino - 3 - acetylamino-, -3-propionylamino- or -3-butyrylaminobenzene, 1-amino-2,5-dimethyl- or -2,5-dimethoxybenzene, 1-amino-2-methoxy-5-methylbenzene, 1,3-diaminobenzene or 1-amino-2,3-tetramethylene-benzene may be employed and the same procedure followed to give scarlet dyestuffs with very similar properties.

Example 2

76.8 parts of the disazo dyestuff obtained by tetrazotization of 1 mole of 4,4'-diamino-5,5'-dimethyl-1,1'-diphenyl-2,2'-disulfonic acid and subsequent coupling with 1 mole of 1-hydroxy-naphthalene-4-sulfonic acid and 1 mole of 1-acetylamino-3-aminobenzene, are dissolved in 2500 parts of water. The solution is cooled to 0–5° and acylated by gradual addition of 11.3 parts of chloroacetyl chloride with stirring. At the same time sodium bicarbonate is strewn in to maintain the pH of the solution between 5 and 7. When all the chloroacetyl chloride has been added, stirring is continued for 1–2 hours at the same temperature and, if the reaction is not yet completed, a little more chloroacetyl chloride is added. As soon as no free amino group is indicated, the reaction mass is neutralized with sodium carbonate solution and the new dyestuff salted out with sodium chloride, isolated and dried at low temperature. It is a red powder which dissolves in water with a clear red coloration. Applied to wool from an acetic acid bath, to which a wetting agent may be added if desired, it gives brilliant scarlet dyeings which are outstandingly level and have excellent wet fastness and very good light fastness.

2 parts of the above described dyestuff, 0.8 part of an oxethylated fatty amine and 0.5 part of an oleylpolyglycol ether are dissolved in 5000 parts of water, and 2 parts of glacial acetic acid are added to the solution. This dyebath is heated to 40–50°, 100 parts of wool entered, and the bath brought to the boil in 30 minutes. It is boiled for 45 minutes and the wool then rinsed and dried. A level scarlet dyeing of very good light and wet fastness is obtained. On completion of dyeing the dyebath may be neutralized with ammonia and the goods treated in it for 20 minutes at 90° in order to obtain somewhat better wet fastness. The same effect can be obtained by aftertreatment of the dyed goods in a fresh bath of 5000 parts of water and 3 parts of hexamethylene tetramine for 20–30 minutes at 90–95°.

When in place of the 11.3 parts of chloroacetyl chloride in the above example, 12.6 parts of β-chloropropionyl chloride or 15.6 parts of chloroformic acid phenyl ester or 9 parts of acrylic acid chloride or 13.2 parts of monochloromaleic acid anhydride are used, dyestuffs with very similar properties are obtained.

*Example 3*

72.6 parts of the disazo dyestuff obtained by tetrazotization of 1 mole of 4,4′-diamino-5,5′-dimethyl-1,1′-diphenyl-2-2′-disulfonic acid and subsequent coupling with 1 mole of 1-hydroxynaphthalene-4-sulfonic acid and 1 mole of 1,3-diaminobenzene, are gradually added in portions to a mixture maintained at 20–40° of 80 parts of chloroacetic acid, 50 parts of sulfuric acid monohydrate and 20 parts of oleum 65%, so that the temperature of 40° is not exceeded. At the same time 80 parts of oleum 65% are run in slowly. The mass is stirred for 12–15 hours at room temperature. On the following morning, no further free amino group being indicated, it is poured onto ice and the precipitated dyestuff filtered off. The dyestuff is stirred into 2000 parts of cold water, neutralized with 20% sodium carbonate solution, and the precipitated sodium salt of the dyestuff is salted out, filtered off and dried at low temperature with vacuum.

A red powder is obtained which dissolves in water with a scarlet coloration and dyes wool and polyamide fibers, if necessary with the addition of a wetting agent, in level shades of very good light and wet fastness.

The following table contains further dyestuffs of Formula I characterized by the reactive radical A, the group

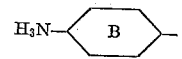

the compound from which Cp is derived and the shade of the aqueous solution in columns (I) to (IV).

| Example No. | (I) Reactive radical A | (II) H₂N—B— | (III) Cp=Radical of— | (IV) Shade of the aqueous solution |
|---|---|---|---|---|
| 4 | 4,5,6-trichloropyrimidyl-(2) | 4-amino-phenyl-(1) | 1-hydroxy naphthalene-4-sulfonic acid | Scarlet. |
| 5 | ---do--- | 4-amino-2-methyl-phenyl-(1) | ---do--- | Do. |
| 6 | ---do--- | 4-amino-2,5-dimethyl-phenyl-(1) | ---do--- | Do. |
| 7 | ---do--- | 4-amino-2-acetyl-aminophenyl-(1) | ---do--- | Do. |
| 8 | ---do--- | 4-amino-3-methyl-aminophenyl-(1) | ---do--- | Do. |
| 9 | ---do--- | 4-amino-3-methoxy-6-methyl-phenyl-(1) | ---do--- | Do. |
| 10 | ---do--- | 4-amino-2-propionylamino-phenyl-(1) | ---do--- | Do. |
| 11 | ---do--- | 1-amino-2-butyrylamino-phenyl-(1) | ---do--- | Do. |
| 12 | ---do--- | 4-amino-2-methylphenyl-(1) | ---do--- | Do. |
| 13 | ---do--- | 4-aminophenyl-(1) | 1-hydroxy-naphthalene-4,6-disulfonic acid | Do. |
| 14 | ---do--- | 4-amino-2-acetyl-aminophenyl-(1) | ---do--- | Do. |
| 15 | ---do--- | 4-amino-2-methyl-phenyl-(1) | ---do--- | Do. |
| 16 | ---do--- | ---do--- | 1-hydroxynaphthalene-3,6-disulfonic acid | Do. |
| 17 | ---do--- | ---do--- | 1-hydroxynaphthalene-3,6,8-trisulfonic acid | Do. |
| 18 | ---do--- | ---do--- | 2-hydroxynaphthalene-6-sulfonic acid | Yellow-red. |
| 19 | ---do--- | 4-amino-2-acetylamino-phenyl-(1) | 2-hydroxynaphthalene-4-sulfonic acid | Do. |
| 20 | ---do--- | ---do--- | 2-hydroxynaphthalene-8-sulfonic acid | Do. |
| 21 | ---do--- | ---do--- | 1-hydroxynaphthalene-5-sulfonic acid | Scarlet. |
| 22 | ---do--- | ---do--- | 2-hydroxynaphthalene-6,8-disulfonic acid | Yellow-red. |
| 23 | ---do--- | ---do--- | 1-hydroxynaphthalene-4,7-disulfonic acid | Scarlet. |
| 24 | β-Chloropropionyl | 4-amino-2-methylphenyl-(1) | 1-hydroxynaphthalene-4,8-disulfonic acid | Do. |
| 25 | Acrylyl | ---do--- | 1-hydroxynaphthalene-4-sulfonic acid | Do. |
| 26 | β-Chloroacrylyl | ---do--- | ---do--- | Do. |
| 27 | β,β-Dichloroacrylyl | ---do--- | ---do--- | Do. |
| 28 | Trichloroacrylyl | ---do--- | ---do--- | Do. |
| 29 | β-Chlorocrotonyl | ---do--- | ---do--- | Do. |
| 30 | —COO—⟨⟩ | ---do--- | ---do--- | Do. |
| 31 | 4-chloromethylbenzoyl | ---do--- | ---do--- | Do. |
| 32 | 4,6-dichloro-1,3,5-triazinyl-(2) | ---do--- | ---do--- | Do. |
| 33 | 4-chloro-6-amino-1,3,5-triazinyl-(2) | ---do--- | ---do--- | Do. |
| 34 | 4-chloro-6-(4′-sulfophenylamino)-1,3,5-triazinyl-(2) | ---do--- | ---do--- | Do. |
| 35 | 4,6-disulfurousester-1,3,5-triazinyl-(2) | ---do--- | ---do--- | Do. |
| 36 | 3-chloro-2-hydroxypropyl | ---do--- | ---do--- | Red. |
| 37 | 4,5-dichloropyrimidyl-(2) | ---do--- | ---do--- | Scarlet. |
| 38 | ---do--- | 4-aminophenyl-(1) | ---do--- | Do. |
| 39 | 4,5-dichloro-6-methyl-pyrimidyl-(2) | ---do--- | ---do--- | Do. |
| 40 | 4,5-dibromo-6-methyl-pyrimidyl-(2) | 4-amino-2-methylphenyl-(1) | ---do--- | Do. |
| 41 | 4,6-dibromopyrimidyl-(2) | ---do--- | ---do--- | Do. |
| 42 | 4,5,6-tribromopyrimidyl-(2) | ---do--- | ---do--- | Do. |

| Example No. | (I) Reactive radical A | (II) H₂N—B— | (III) Cp=Radical of— | (IV) Shade of the aqueous solution |
|---|---|---|---|---|
| 43 | Chloroacetyl | 4-amino-2-methylphenyl-(1) | 1-hydroxynaphthalene-4,6-disulfonic acid | Do. |
| 44 | do | do | 1-hydroxynaphthalene-5-sulfonic acid | Do. |
| 45 | do | 4-amino-2-acetylamino-phenyl-(1) | do | Do. |
| 46 | do | do | 1-hydroxynaphthalene-4,8-sulfonic acid | Do. |
| 47 | do | 4-amino-2-chloroacetylamino-phenyl-(1) | 1-hydroxynaphthalene-5-sulfonic acid | Do. |
| 48 | β-Chloropropionyl | 4-amino-2-β-chloropropionyl-amino-phenyl-(1) | 1-hydroxynaphthalene-4-sulfonic acid | Do. |
| 49 | 4,6-dichloropyrimidyl-(2) | 4-amino-2-methylphenyl-(1) | 2-amino-8-hydroxynaphthalene-6-sulfonic acid (acid coupled) | Blue-red. |
| 50 | 4,5,6-trichloropyrimidyl-(2) | do | 2-(2',4',6'-trimethyl-phenylamino)-8-hydroxynaphthalene-6-sulfonic acid (acid coupled) | Bluish Bordeaux. |
| 51 | Chloroacetyl | do | 2-acetyl-amino-5-hydroxynaphthalene-7-sulfonic acid | Red. |
| 52 | do | do | 1-benzoylamino-8-hydroxynaphthalene-3,6-disulfonic acid | Blue-red. |
| 53 | do | do | 2-chloroacetylamino-5-hydroxynaphthalene-1,7-disulfonic acid | Red. |
| 54 | 4,6-dichloro-1,3,5-triazinyl-(2) | do | 2-[4'-chloro-6'-phenylamino-1',3',5'-triazinyl-(2')-amino]-5-hydroxynaphthalene-7,4'''-disulfonic acid | Blue-red. |
| 55 | Chloroacetyl | 4-amino-2,3-tetramethylene-phenyl-(1) | 1-hydroxynaphthalene-4-sulfonic acid | Red. |
| 56 | do | 4-amino-2-methylphenyl-(1) | do | Scarlet. |

*Example 57*

A fabric of viscose staple fibre is padded with a 3% neutral solution of the dyestuff of Example 5 at 50° to give an increase of about 85% over the dry weight. After intermediate drying, the dyestuff is fixed by treating the goods for about 1 hour with constant agitation in a bath at 80–90° containing 250 parts of calcined sodium sulfate, 15 parts of trisodium phosphate and 3 parts of sodium 1-nitrobenzene-3-sulfonate per 1000 parts of liquor. The liquor-to-goods ratio of this fixation bath is between 1:10 and 1:50. After fixation, the goods are well rinsed with cold water, soaped at the boil, rinsed and dried. The scarlet shade obtained is outstandingly fast to light and wet treatments.

*Example 58*

A mercerized cotton fabric is padded at 40° with a liquor containing 40 g./l. of calcined sodium carbonate, 20 g./l. of the dyestuff of Example 7, and 5 g./l. of sodium 1-nitrobenzene-3-sulfonate. The padding effect gives an increase of 80–100% on the dry weight. The fabric is rolled and conditioned in a chamber for 4 to 6 hours at 90–95° and at constant humidity then well rinsed in cold and warm water, soaped at the boil with 5 g./l. of soap for 15 minutes, rinsed again and dried. A scarlet dyeing with good light and wet fastness is obtained. The treatment in a conditioning chamber can also be replaced by steaming for 10 to 15 minutes at 102–104° or by a treatment in dry heat for 4–5 minutes at 140–150° of for 1–2 minutes at 180–200°.

Formulae of representative dyes of the foregoing examples are as follows.

Example 1:

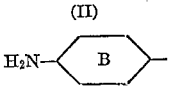

Example 2:

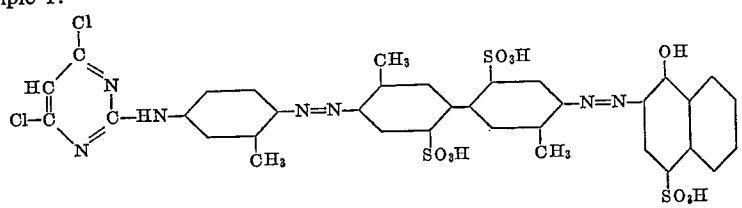

Example 3:

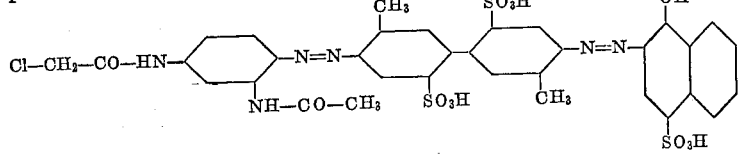

Example 4:

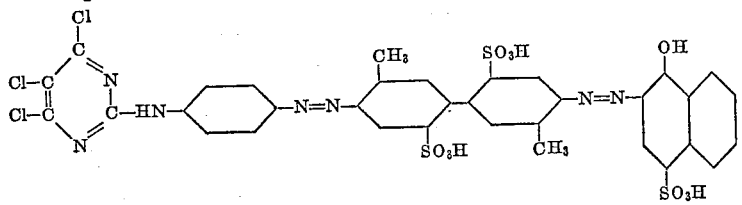

Example 5:

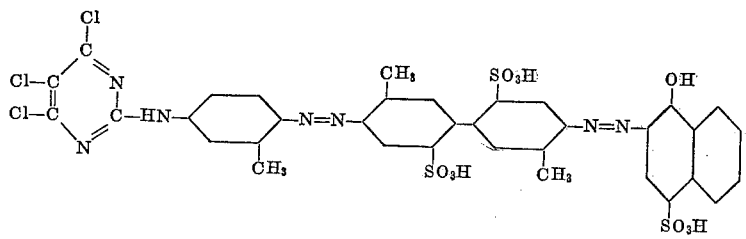

Example 12:

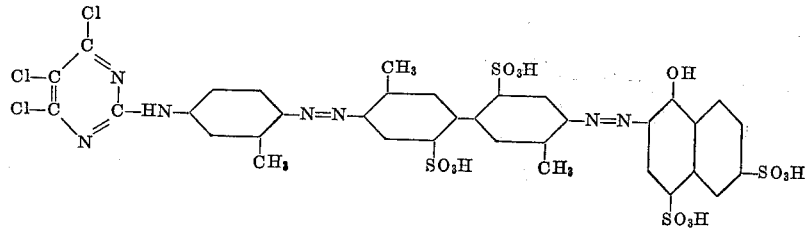

Example 56:

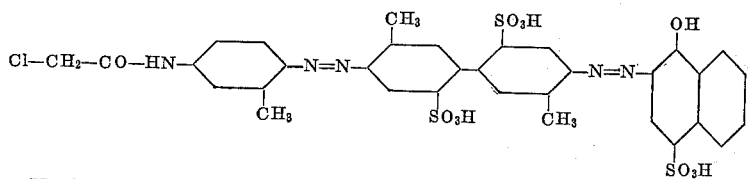

Having thus disclosed the invention what we claim is:

1. Reactive dyes of the formula

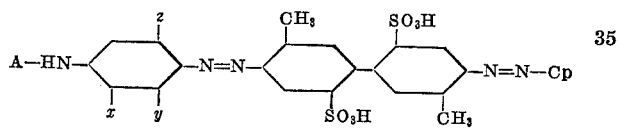

wherein

A represents a radical capable of reacting with cellulosic and polyamide fibers, said radical being selected from the group consisting of chloroacetyl, β - chloropropionyl, 4,5,6 - trichloropyrimidyl-(2), acrylyl, β-chloroacrylyl, β,β-dichloroacrylyl, trichloroacrylyl, β-chlorocrotonyl, 4-chloromethylbenzoyl, 4,6-dichloro-1,3,5-triazinyl-(2), 4-chloro-6-(4'-sulfophenylamino) - 1,3,5 - triazinyl-(2), 3-chloro-2-hydroxypropyl, 4,5 - dichloropyrimidyl-(2), 4,5 - dichloro - 6 - methyl-pyrimidyl - (2), 4,5-dibromo-6- methylpyrimidyl - (2), 4,6 - dibromopyrimidyl-(2), 4,5,6 - tribromopyrimidyl - (2), 4,6 - dichloropyrimidyl - (2), 4,5,6 - trichloropyrimidyl - (2), and 4-chloro-6-amino-1,3,5-triazinyl-(2).

Cp represents the radical of a coupling component selected from the group consisting of a hydroxynaphthalene monosulfonic acid, a hydroxynaphthalene disulfonic acid, a hydroxynaphthalenetrisulfonic acid, a (trimethylphenyl)-amino-hydroxynaphthalene-sulfonic acid and an acylaminohydroxynaphthalenedisulfonic acid.

x represents a member selected from the group consisting of hydrogen, methyl, methoxy and together with y, the chain —CH$_2$—CH$_2$—CH$_2$—CH$_2$—, y represents a member selected from the group consisting of hydrogen, methyl, methoxy, amino, lower alkanoyl amino and, together with x, the chain —CH$_2$—CH$_2$—CH$_2$—CH$_2$—, and z represents a member selected from the group consisting of hydrogen, methyl and methoxy.

2. The reactive dye of the formula

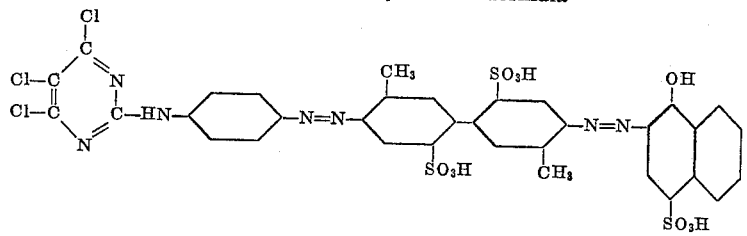

3. The reactive dye of the formula

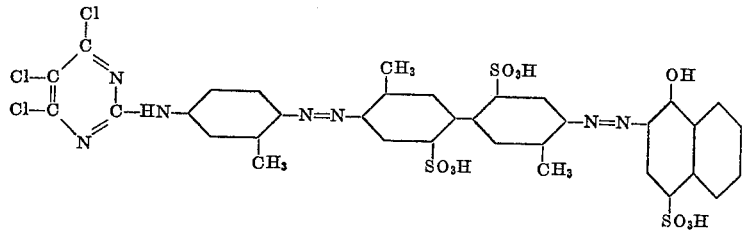

4. The reactive dye of the formula
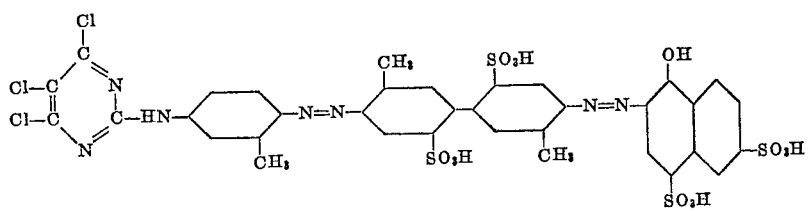
5. The reactive dye of the formula
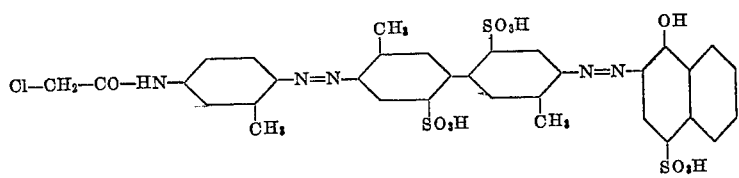
6. The reactive dye of the formula
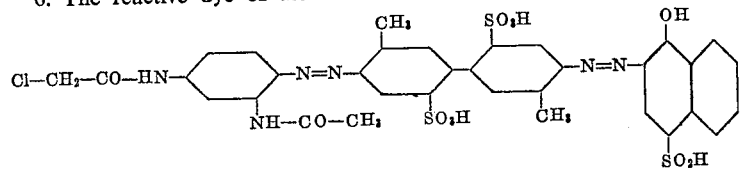
References Cited in the file of this patent
UNITED STATES PATENTS
| | | |
|---|---|---|
| 1,886,480 | Haller et al. | Nov. 8, 1932 |
| 2,935,506 | Heslop et al. | May 3, 1960 |

UNITED STATES PATENT OFFICE
CERTIFICATE OF CORRECTION

Patent No. 3,133,911                          May 19, 1964

Hans-Rudolf Byland et al.

It is hereby certified that error appears in the above numbered patent requiring correction and that the said Letters Patent should read as corrected below.

Column 1, lines 33 to 38, the right-hand portion of formula (II), for "-N=N-C" read -- -N=N-Cp --; column 2, line 44, for "arommatic" read -- aromatic --; column 5, line 27, for "dyening" read -- dyeing --.

Signed and sealed this 24th day of November 1964.

(SEAL)
Attest:

ERNEST W. SWIDER                                      EDWARD J. BRENNER
Attesting Officer                                          Commissioner of Patents